United States Patent
Kim et al.

(10) Patent No.: US 12,531,147 B2
(45) Date of Patent: Jan. 20, 2026

(54) METHOD AND SYSTEM FOR AUTOMATING DENTAL CROWN DESIGN BASED ON ARTIFICIAL INTELLIGENCE

(71) Applicant: KOREA INSTITUTE OF SCIENCE AND TECHNOLOGY, Seoul (KR)

(72) Inventors: Hyung Min Kim, Seoul (KR); Heekyung Koh, Seoul (KR); Taeyoung Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 344 days.

(21) Appl. No.: 18/449,093

(22) Filed: Aug. 14, 2023

(65) Prior Publication Data

US 2024/0062882 A1  Feb. 22, 2024

(30) Foreign Application Priority Data

Aug. 17, 2022  (KR) .......................... 10-2022-0102693

(51) Int. Cl.
  *G06F 17/00*  (2019.01)
  *G06T 17/00*  (2006.01)
  *G16H 30/40*  (2018.01)

(52) U.S. Cl.
  CPC ............. *G16H 30/40* (2018.01); *G06T 17/00* (2013.01); *G06T 2207/30036* (2013.01)

(58) Field of Classification Search
  CPC ................................ G16H 30/40; G06T 17/00
  See application file for complete search history.

(56) References Cited

U.S. PATENT DOCUMENTS 8,545,221 B2 * 10/2013 Stone-Collonge ..... G16H 30/40
 433/24
9,117,255 B2 * 8/2015 Choi ....................... G06T 17/00
(Continued)

FOREIGN PATENT DOCUMENTS

KR  10-2020-0070700 A  6/2020
KR  10-2020-0108851 A  9/2020
(Continued)

OTHER PUBLICATIONS

Korean Notice of Allowance issued on Mar. 19, 2025, in corresponding Korean Patent Application No. 10-2022-0102693 (1 page in English, 1 page in Korean).
(Continued)

*Primary Examiner* — Mohammed H Zuberi
(74) *Attorney, Agent, or Firm* — NSIP Law

(57) ABSTRACT

Disclosed in the present application is provided a method of automating a dental crown design based on artificial intelligence, the method may include: acquiring a three-dimensional intra-oral scanner image acquired from a patient and a three-dimensional dental crown mesh image designed by a dental technician in correspondence with the intra-oral scanner image; preprocessing the acquired three-dimensional intra-oral scanner image and the three-dimensional dental crown mesh image designed by the dental technician in correspondence with the intra-oral scanner image; converting an input mesh model and an output mesh model into an input voxel image and an output voxel image, respectively; and generating an AI output voxel image corresponding to the input voxel image using the converted input voxel image and output voxel image as training data, and training an artificial neural network by comparing the generated AI output voxel image with the output voxel image included in the training data.

18 Claims, 9 Drawing Sheets

(56) References Cited

U.S. PATENT DOCUMENTS

| | | | |
|---|---|---|---|
| 11,007,040 B2* | 5/2021 | Azernikov | G16H 50/50 |
| 11,191,618 B1* | 12/2021 | Raslambekov | G06T 17/10 |
| 11,701,204 B1* | 7/2023 | Raslambekov | A61C 7/08 |
| | | | 345/418 |
| 11,960,795 B2* | 4/2024 | Fabbri | A61C 13/0004 |
| 12,136,215 B2* | 11/2024 | Ghosh | G16H 50/50 |
| 12,138,132 B2* | 11/2024 | Öjelund | A61C 13/0004 |
| 2006/0008777 A1* | 1/2006 | Peterson | A61C 13/0019 |
| | | | 433/223 |
| 2006/0154211 A1* | 7/2006 | Bybee | A61C 5/77 |
| | | | 433/223 |
| 2015/0111177 A1* | 4/2015 | Fisker | A61C 13/08 |
| | | | 433/199.1 |
| 2015/0245886 A1* | 9/2015 | Hegland | A61C 13/0003 |
| | | | 433/29 |
| 2018/0036097 A1* | 2/2018 | Kim | A61C 1/082 |
| 2019/0021815 A1* | 1/2019 | Herrmann | A61C 5/73 |
| 2019/0209274 A1* | 7/2019 | Barak | A61C 13/0004 |
| 2019/0282344 A1 | 9/2019 | Azernikov et al. | |
| 2020/0206092 A1* | 7/2020 | Herrmann | C08L 33/08 |
| 2020/0320685 A1* | 10/2020 | Anssari Moin | G06N 3/08 |
| 2021/0082184 A1* | 3/2021 | Claessen | G06T 17/20 |
| 2021/0110584 A1* | 4/2021 | Claessen | G06T 11/008 |
| 2021/0174543 A1* | 6/2021 | Claessen | G06T 7/344 |
| 2021/0322136 A1* | 10/2021 | Anssari Moin | G06T 7/168 |
| 2022/0000582 A1* | 1/2022 | Ziskind | A61K 6/884 |
| 2022/0067943 A1* | 3/2022 | Claessen | G06V 10/764 |
| 2022/0092999 A1* | 3/2022 | Callan | G09B 19/0084 |
| 2022/0096205 A1* | 3/2022 | Prasad | A61C 5/77 |
| 2022/0292737 A1 | 9/2022 | Kim et al. | |
| 2023/0084657 A1* | 3/2023 | Kim | C04B 35/63452 |
| | | | 433/222.1 |
| 2023/0153476 A1* | 5/2023 | Fabbri | G16H 50/20 |
| | | | 706/47 |
| 2024/0320382 A1* | 9/2024 | Gandrud | A61C 7/002 |

FOREIGN PATENT DOCUMENTS

| | | |
|---|---|---|
| KR | 10-2021-0013149 A | 2/2021 |
| KR | 10-2021-0037038 A | 4/2021 |
| KR | 10-2021-0063640 A | 6/2021 |
| KR | 10-2288816 B1 | 8/2021 |
| KR | 10-2022-0042660 A | 4/2022 |
| KR | 10-2022-0056234 A | 5/2022 |
| KR | 10-2395582 B1 | 5/2022 |
| KR | 10-2022-0128505 A | 9/2022 |
| WO | WO 2021/046147 A1 | 3/2021 |

OTHER PUBLICATIONS

Koh, Heekyung et al., "Acoustic Simulation for Transcranial Focused Ultrasound Using GAN-Based Synthetic CT", IEEE Journal of Biomedical and Health Informatics, vol. 26, No. 1, Jan. 2022, (p. 161-171).

Tian, Sukun et al., "DCPR-GAN: Dental Crown Prosthesis Restoration Using Two-Stage Generative Adversarial Networks", IEEE Journal of Biomedical and Health Informatics, vol. 26, No. 1, Jan. 2022, (p. 151-160).

* cited by examiner

Depth map loss $\hat{Y}_{depth}$ $Y_{depth}$ $$Depth = \frac{1}{n}\sum_{i=1}^{i}|Y_{depth(i)} - \hat{Y}_{depth(i)}|$$

METHOD AND SYSTEM FOR AUTOMATING DENTAL CROWN DESIGN BASED ON ARTIFICIAL INTELLIGENCE

DESCRIPTION OF GOVERNMENT-SPONSORED RESEARCH

This study was conducted under the auspices of the Korea Institute of Science and Technology (KIST), with support from the Ministry of Science and ICT through the Korea Institute of Science and Technology Research and Development (R&D) Operational Support [2022 Commercialization Technology Development Project (Linking Lab), Project serial number: 09280].

CROSS REFERENCE TO RELATED APPLICATION

The present application claims priority to Korean Patent Application No. 10-2022-0102693, filed Aug. 17, 2022, the entire contents of which is incorporated herein for all purposes by this reference.

BACKGROUND OF THE INVENTION

Field of the Invention

The present application relates to a method and system for automating a dental crown design that takes into account morphological characteristics of a three-dimension based dental crown using an artificial neural network model.

Description of the Related Art

In a dental laboratory, a patient's teeth and dental prosthesis are designed by a dental technician from STL files and dedicated tooth design CAD software, and then produced using a milling machine in the dental laboratory.

Currently, in the dental care market, an intra-oral scanner that extracts a tooth model in the form of a digital file (STL) is rapidly spreading, there is no loss of existing materials, and precision of reproducibility is improving. Patient's intra-oral data are digitally sent to a dental laboratory as the form of an STL file from a dental clinic, and the design of a dental prosthesis is carried out in a dental design dedicated CAD using this data.

As described above, currently, digitization throughout the entire industry has been carried out by domestic and foreign companies for manufacturing patient-customized prostheses, but time and resources required to design for patient-customized products have not been significantly reduced compared to the existing conventional work methods in a digital process. Consequently, there is a need for artificial intelligence algorithms that can further maximize efficiency.

In addition, since the existing dental crown generation algorithm is trained based on a rendered image of the crown from a two-dimension model, there has been a problem of not being able to realize the morphological characteristics of the crown in three dimensions.

SUMMARY OF THE INVENTION

The present application is directed to solving the above problems and implementing a dental crown design algorithm by building a three-dimension based dental crown generation model that is not only compensating for morphological characteristics of the crown, but also considering the shape of an occlusal surface.

The present application relates to a method and system for automating a dental crown design that takes into account morphological characteristics of a three-dimension based dental crown using a trainable artificial neural network model.

A method of automating a dental crown design based on artificial intelligence executed by a processor, according to an embodiment of the present application, the method may include: acquiring a three-dimensional intra-oral scanner image acquired from a patient and a three-dimensional dental crown mesh image designed by a dental technician in correspondence with the intra-oral scanner image—wherein the intra-oral scanner image includes scanned images of adjacent and opposing teeth for which a dental crown is to be generated—; preprocessing the acquired three-dimensional intra-oral scanner image and the three-dimensional dental crown mesh image designed by the dental technician in correspondence with the intra-oral scanner image— wherein an input mesh model combining adjacent and opposing teeth and an output mesh model combining the input mesh model with the dental crown designed by the dental technician are each generated based on the three-dimensional intra-oral scanner image—; converting the input mesh model and the output mesh model into an input voxel image and an output voxel image, respectively; and generating an AI output voxel image corresponding to the input voxel image using the converted input voxel image and output voxel image as training data, and training an artificial neural network by comparing the generated AI output voxel image with the output voxel image included in the training data.

In an embodiment, the method may further include: receiving a three-dimensional intra-oral scanner image including scanned images of adjacent teeth and opposing teeth for which a dental crown is to be generated; preprocessing the three-dimensional intra-oral scanner image— wherein an input mesh model combining adjacent teeth and opposing teeth based on the intra-oral scanner image; converting the input mesh model into an input voxel image; generating an AI output voxel image corresponding to the input voxel image by inputting the input mesh model to a trained artificial neural network; and generating an AI output mesh model by meshing the AI output voxel image.

In an embodiment, the method may further include extracting an STL file, based on the AI output mesh model, so that the dental crown is actually produced from a milling machine.

In an embodiment, the training of the artificial neural network may include: a first process configured to generate an AI output voxel image corresponding to an input voxel image included in the training data using a generator; a second process configured to acquire error data by comparing the generated AI output voxel image with an output voxel image included in the training data using a discriminator; and a third process configured to train the generator using the error data.

In an embodiment, the artificial neural network may be trained to reduce an error between the output voxel image and the generated AI output voxel image by repeatedly performing the first to third processes.

In an embodiment, the preprocessing may include setting a bounding box based on an area of interest in the intra-oral scanner image; and removing unnecessary portions for training, and in which the area of interest may be set to include at least one or more adjacent teeth and opposing teeth with respect to the dental crown to be generated.

In an embodiment, the third process may reduce a similarity error between the output voxel image and the AI output voxel image using a dice similarity coefficient loss. In an embodiment, the Dice similarity coefficient loss is calculated by the following [Equation 1], $$DSC = 1 - \frac{2*|Y \cap \hat{Y}|}{|Y| + |\hat{Y}|} \quad \text{[Equation 1]}$$

In [Equation 1] above, Y denotes an area where the pixel value of the output voxel image is 1, and $\hat{Y}$ denotes an area where the pixel value of the AI output voxel image generated by the generator is 1.

In an embodiment, the third process may reduce a similarity error for a volumetric shape of a lateral surface of the dental crown considering an occlusal surface in the output voxel image and an occlusal surface in the AI output voxel image using a depth map loss. In an embodiment, the depth map loss is calculated by the following [Equation 2], $$\text{Depth} = \frac{1}{n}\sum_{i=1}^{n} |Y_{depth(i)} - \hat{Y}_{depth(i)}| \quad \text{[Equation 2]}$$

In [Equation 2], $Y_{depth(i)}$ is the pixel value of the ith depth map image of the output voxel image, $\hat{Y}_{depth(i)}$ represents the pixel value of the ith depth map image of the AI output voxel image, and n is the number of pixels of the depth map image.

In an embodiment, the third process may include: removing opposing teeth of a tooth for which the dental crown has been generated, after meshing the AI output voxel image generated by the generator; positioning a camera above the generated dental crown in a vertical direction, and setting a center of the dental crown as a focal position; and acquiring a depth map image through rendering.

In an embodiment, the third process may use a boundary loss to reduce a similarity error for a volumetric shape of a lateral surface of the dental crown considering a distance between a boundary surface in the output voxel image and a boundary surface in the AI output voxel image.

In an embodiment, the third process may include: creating a signed distance map in which a distance is calculated from a boundary surface of the output voxel image; acquiring an integral value of a distance between a boundary line of the AI output voxel image and a boundary line of the output voxel image for a point on the boundary line of the output voxel image using the calculated signed distance map; and performing a training in a direction that reduces a distance between the AI output voxel image and the output voxel image.

In an embodiment, the generator may be a convolutional layer-transpose convolutional layer (encoder-decoder) structure based on ResNet.

In an embodiment, the discriminator may be a convolutional layer (encoder) structure based on PatchGAN.

In an embodiment, the artificial neural network may generate an AI output voxel image corresponding to an input voxel image through trained nonlinear mapping.

There may be provided a computer program stored on a computer-readable recording medium for executing the method of automating a dental crown design based on artificial intelligence according to an embodiment.

A system for automating a dental crown design based on artificial intelligence, according to an embodiment of the present disclosure, the system may include: a unit for acquiring a three-dimensional intra-oral scanner image acquired from a patient and a three-dimensional dental crown mesh image designed by a dental technician in correspondence with the intra-oral scanner image—wherein the intra-oral scanner image includes scanned images of adjacent and opposing teeth for which a dental crown is to be generated—; a unit for preprocessing the acquired three-dimensional intra-oral scanner image and the three-dimensional dental crown mesh image designed by the dental technician in correspondence with the intra-oral scanner image—wherein an input mesh model combining adjacent and opposing teeth and an output mesh model combining the input mesh model with the dental crown designed by the dental technician are each generated based on the three-dimensional intra-oral scanner image—; a unit for converting the input mesh model and the output mesh model into an input voxel image and an output voxel image, respectively; and a unit for generating an AI output voxel image corresponding to the input voxel image using the converted input voxel image and output voxel image as training data, and training an artificial neural network by comparing the generated AI output voxel image with the output voxel image included in the training data.

According to the method and system for automating a dental crown design based on artificial intelligence according to an embodiment of the present application, it is not necessary to generate a dental crown surface and connector model restored in three dimensions when using a two-dimensional based model by using a three-dimensional based model.

It is possible to increase work efficiency and reduce labor costs for related professions by automating the design of patient-customized dental crowns.

It is possible to improve product precision and quality uniformity by preventing design deviations due to dental technicians' skill level or fatigue.

It is possible to link the developed artificial neural network with digital medical devices and software to consistently use accurate data from diagnosis to treatment and the production of dental prosthesis, and it is possible to produce the dental prosthesis immediately upon the patient's visit and perform the treatment on the same day.

The effects of the present application are not limited to those mentioned above, and other effects not mentioned will be clearly understood by those skilled in the art from the description of the claims.

BRIEF DESCRIPTION OF THE DRAWINGS

To more clearly describe the technical solutions of the embodiments of the present application or the related art, the drawings required in the description of the embodiments are briefly described below. It should be understood that the following drawings are for the purpose of describing the embodiments of the present specification and are not for the purpose of limitation. In addition, for clarity of description, the representation of some constituent elements of the drawings may be exaggerated or omitted.

DETAILED DESCRIPTION OF THE INVENTION

Figure 1:
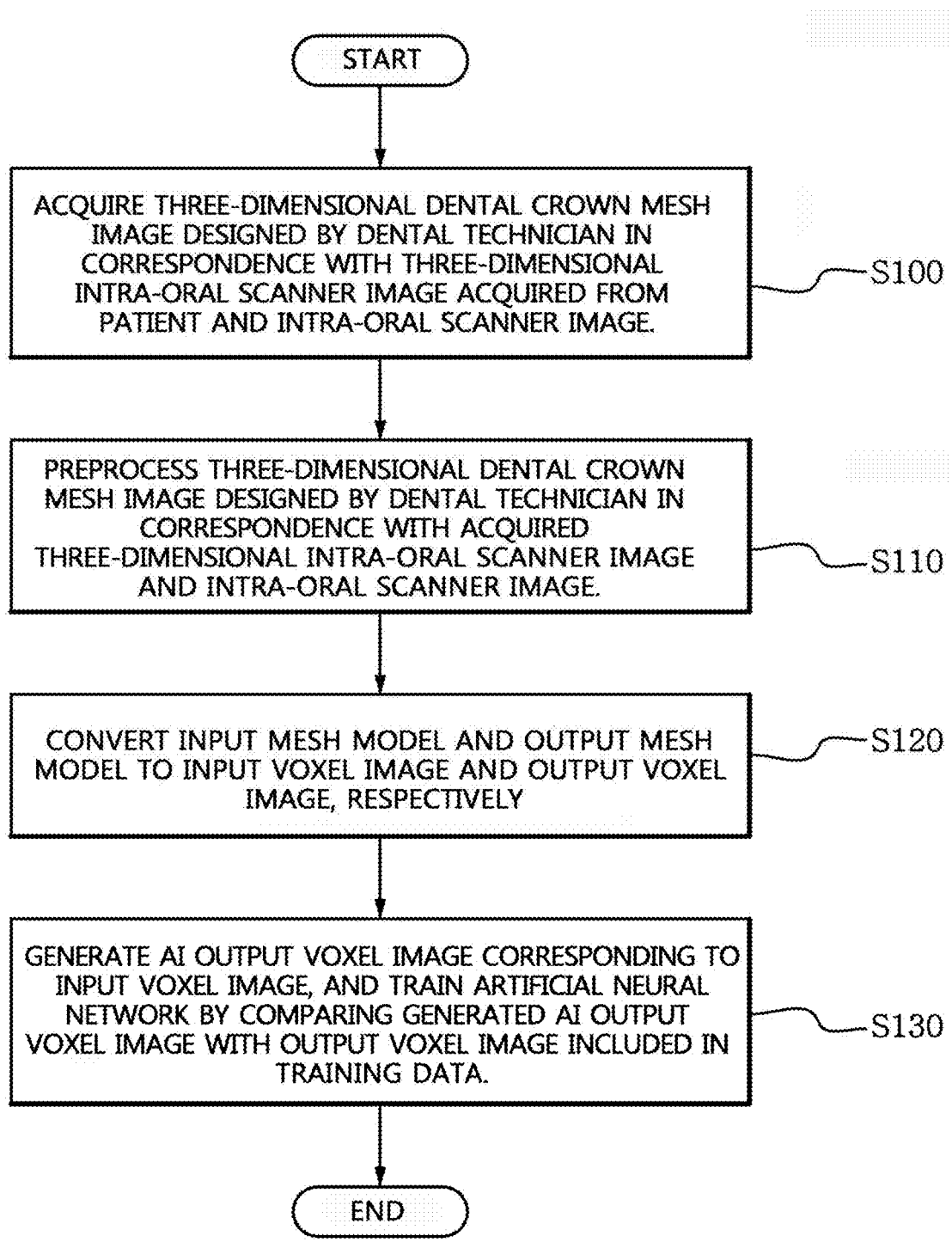
FIG. 1 is a flowchart for describing a method of automating a dental crown design based on artificial intelligence, according to an embodiment.

The following detailed description of the present application will be made with reference to the accompanying drawings illustrating specific exemplary embodiments for carrying out the present application. These exemplary embodiments will be described in detail enough to carry out the present application by those skilled in the art. It should be understood that various exemplary embodiments of the present application are different from one another but need not be mutually exclusive. For example, particular shapes, structures, and characteristics described herein in respect to one exemplary embodiment may be implemented in other exemplary embodiments without departing from the spirit and scope of the present application. In addition, it should be understood that the position or arrangement of each constituent element in the respective disclosed exemplary embodiments may be changed without departing from the spirit and scope of the present application. Therefore, the following detailed description is not considered as having limited meanings, and the scope of the present application, if adequately explained, is limited only by the appended claims as well as all the scopes equivalent to the appended claims. Like reference numerals in the drawings refer to the same or similar functions throughout several aspects.

The terms used in the present specification are selected from general terms currently widely used in the art in consideration of functions, but the terms may vary according to the intention of those skilled in the art, convention, or new technology in the art. Further, specified terms are selected arbitrarily by the applicant, and in this case, the meaning thereof will be described in the detailed description of the present specification. Thus, the terms used in the present specification should be interpreted based on not simple names but the substantial meaning of the terms and the overall description of the present specification.

Hereinafter, exemplary embodiments of the present application will be described in detail with reference to the drawings.

FIG. 1 is a flowchart for describing a method of automating a dental crown design based on artificial intelligence, according to an embodiment.

With reference to FIG. 1, a method of automating a dental crown design based on artificial intelligence according to the present application (hereinafter, referred to as the "dental crown design method") may include acquiring a three-dimensional intra-oral scanner image of a patient and a three-dimensional dental crown mesh image designed by a dental technician corresponding to the intra-oral scanner image (S100), preprocessing the acquired three-dimensional intra-oral scanner image and the three-dimensional dental crown mesh image (S110), converting an input mesh model and an output mesh model into an input voxel image and an output voxel image, respectively (S120), and training an artificial neural network by generating an AI output voxel image, and comparing the generated AI output voxel image to an output voxel image included in training data (S130). Each of the steps described above may be implemented as a function of an application stored on a medium for execution on a smartphone, tablet, laptop, or computer having acquisition means for acquiring data, processing means for processing the acquired data, and output means. The dental crown design method may be performed on a system equipped with a three-dimensional scanner equipment and a server.

The intra-oral scanner image includes scan images of adjacent teeth that are peripheral portions of missing teeth portion for which a dental crown is to be generated, and opposing teeth that are in a position to be engaged with the missing teeth. The intra-oral scanner image may be acquired using extra-oral scanning with lighting by scanning a model of teeth that is imprinted with the patient's teeth. In an example, the intra-oral scanner image of the patient may be taken by intra-oral scanning.

In general, when a conventional dental prosthesis is manufactured, intra-oral information on the patient on which a design is based is acquired by intra-oral scanning. However, in this case, when a patient's set of teeth is scanned intra-orally, even if the scanning is performed with the most expensive equipment, a resolution of image of the set of teeth is reduced, and it is difficult to avoid significant noise due to a dark intra-oral environment and light reflection from the teeth.

Therefore, at step S100 in which the intra-oral scanner image according to the present embodiment is acquired, input data for establishing the training data may be acquired through extra-oral imaging rather than intra-oral imaging of the patient to secure the accuracy and efficiency of training. For scanning in an extra-oral environment, after separately manufacturing a model corresponding to the patient's set of teeth, the manufactured model may be scanned using a scanner under a certain lighting condition.

At step S110 in which the acquired three-dimensional intra-oral scanner image and the three-dimensional dental crown mesh image are preprocessed, an input mesh model combining adjacent teeth and opposing teeth and an output mesh model combining the input mesh model with a dental crown designed by a dental technician may be generated, respectively based on the three-dimensional intra-oral scanner image.

Step S120 of converting the input mesh model and the output mesh model into an input voxel image and an output voxel image, respectively, is a step of converting the preprocessed image at step S110 of preprocessing into a three-dimensional voxel label map in order to convert the preprocessed image into an input and output image of the artificial neural network.

At step S130 of training the artificial neural network, using the converted input voxel image and output voxel image as training data, an AI output voxel image corresponding to the input voxel image is generated, and the generated AI output voxel image is compared with the output voxel image included in the training data. In an embodiment, the artificial neural network may be a conditional generative adversarial neural network, and is a step of training a nonlinear mapping that generates from a teeth missing image, which is an input image, to an image in which a dental crown is generated.

Figure 2:
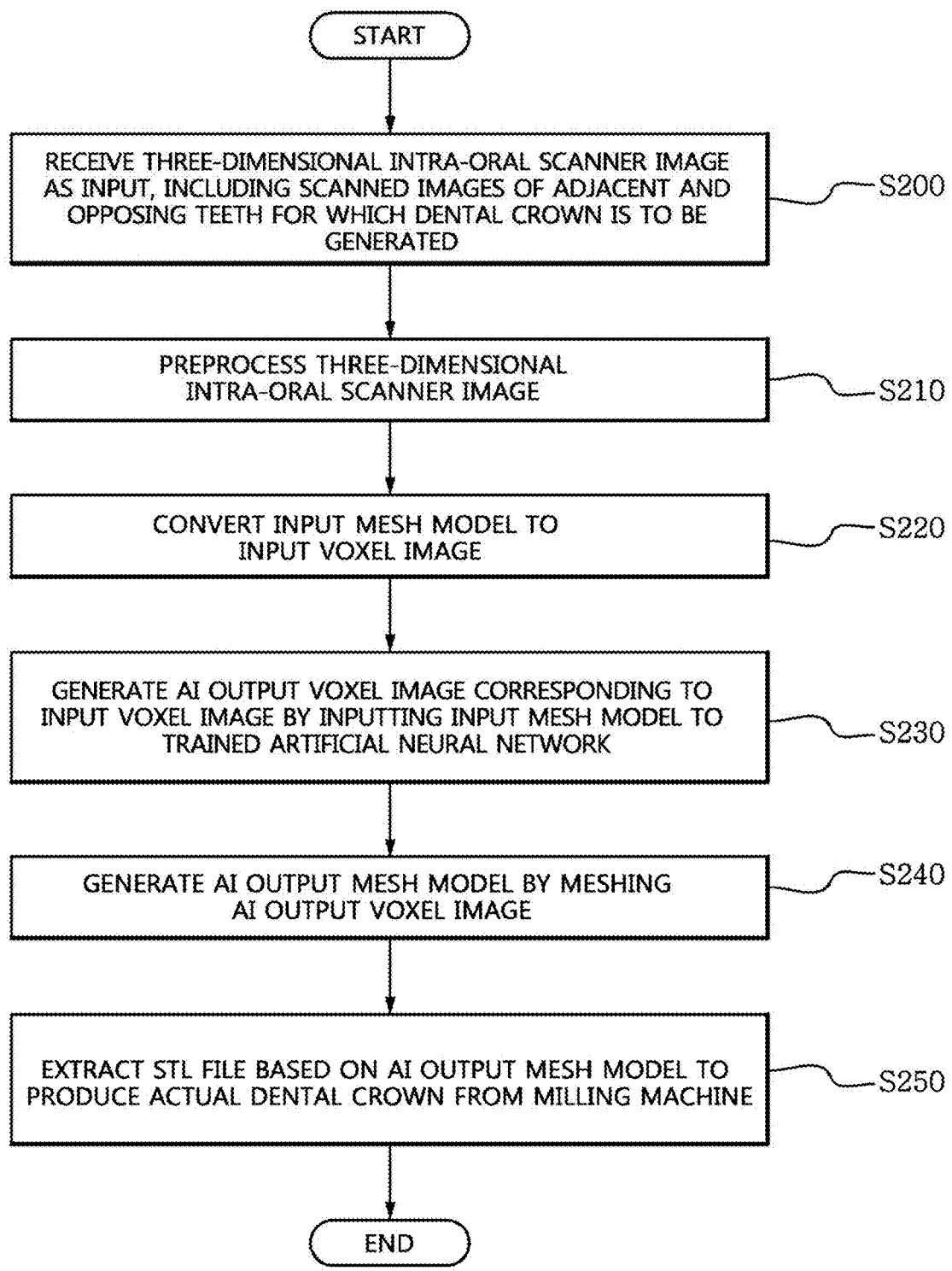
FIG. 2 is a flowchart for describing the method of automating a dental crown design based on artificial intelligence using the trained artificial neural network of FIG. 1, according to an embodiment.

FIG. 2 is a flowchart for describing the method of automating a dental crown design based on artificial intelligence using the trained artificial neural network of FIG. 1, according to an embodiment.

With reference to FIG. 2, a dental crown design method may include receiving a three-dimensional intra-oral scanner image including scanned images of adjacent teeth and opposing teeth for which a dental crown is to be generated (S200), preprocessing the three-dimensional intra-oral scanner image (S210), converting an input mesh model into an input voxel image (S220), generating an AI output voxel image corresponding to the input voxel image by inputting the input mesh model to a trained artificial neural network (S230), generating an AI output mesh model by meshing the AI output voxel image (S240), and extracting an STL file based on the AI output mesh model so that the dental crown is actually produced by a milling machine (S250). Each of steps S200, S210, and S220 may correspond to steps S100, S110, and S120 of FIG. 1. At step S250, based on the AI output mesh model, the STL file is extracted so that the dental crown may be actually produced by the milling machine. The output of the neural network is generated as a three-dimensional voxel image and is conveniently converted to a mesh model. Once converted to the mesh model, a process of designing a connector between the dental crown and gums may be omitted, dental prosthesis may be produced through the milling machine in the dental laboratory using the STL file.

Figure 3:
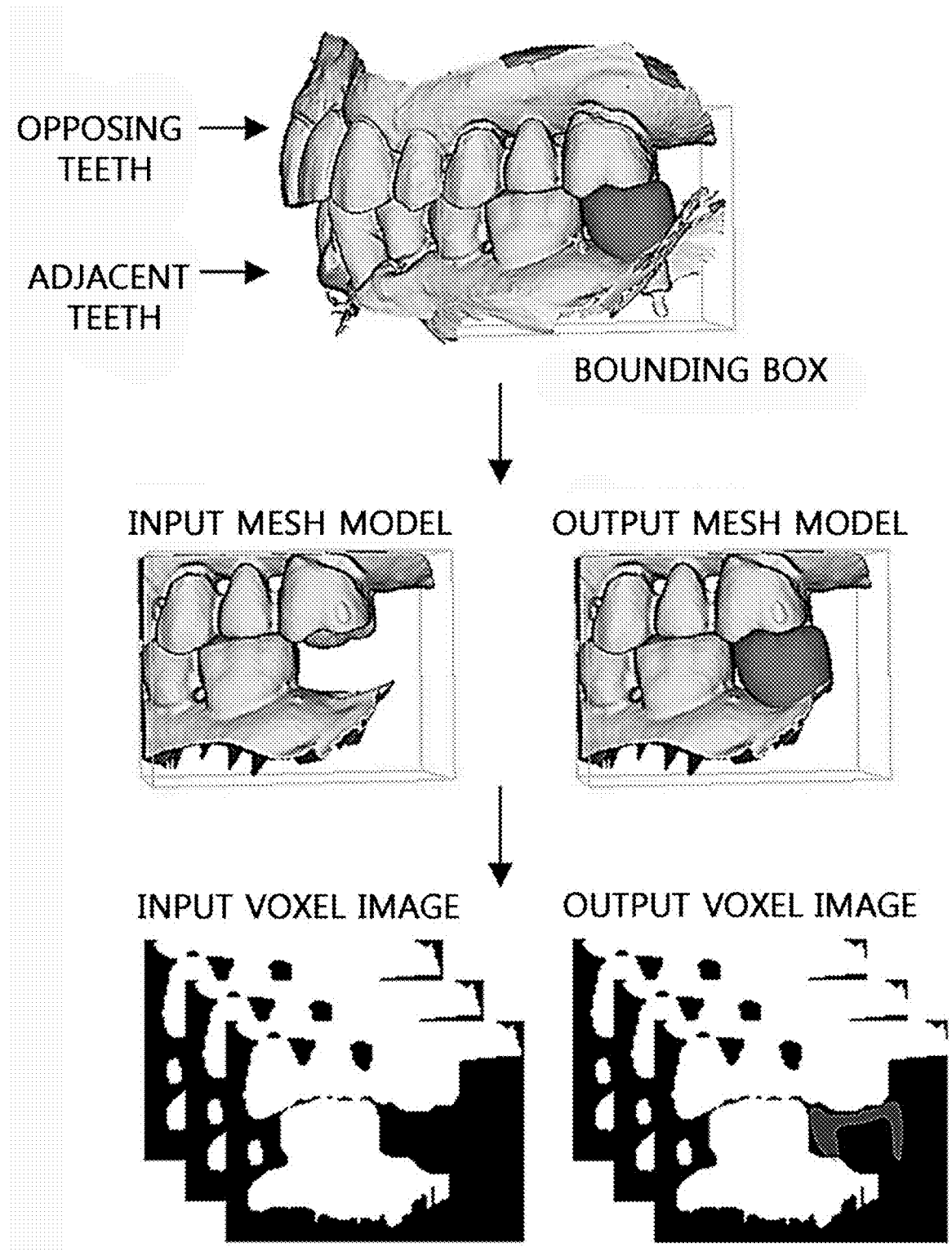
FIG. 3 illustrates a process of preprocessing a three dimensional intra-oral scanner image, according to an embodiment.

FIG. 3 illustrates a process for preprocessing a three-dimensional intra-oral scanner image, according to an embodiment.

With reference to FIG. 3, step S110 of preprocessing may include setting a bounding box based on an area of interest in the intra-oral scanner image, and removing unnecessary portions for training. The area of interest may be set to include at least one or more adjacent teeth and opposing teeth with respect to the dental crown to be generated. When the bounding box is set and cropped, the cropped adjacent teeth and opposing teeth may be processed as closed mesh models with the closed calculation since they are open surface models. To be converted into an input and output images for the artificial neural network, an input mesh model combining opposing teeth with adjacent teeth and an output mesh model combining the input mesh model with a dental crown designed by a dental technician may be generated, respectively, through appending algorithm. Each of the generated input mesh model and output and input voxel images, and output voxel image, may be converted to an input voxel image and an output voxel image, respectively, and used as training data for the artificial neural network.

Figure 4:
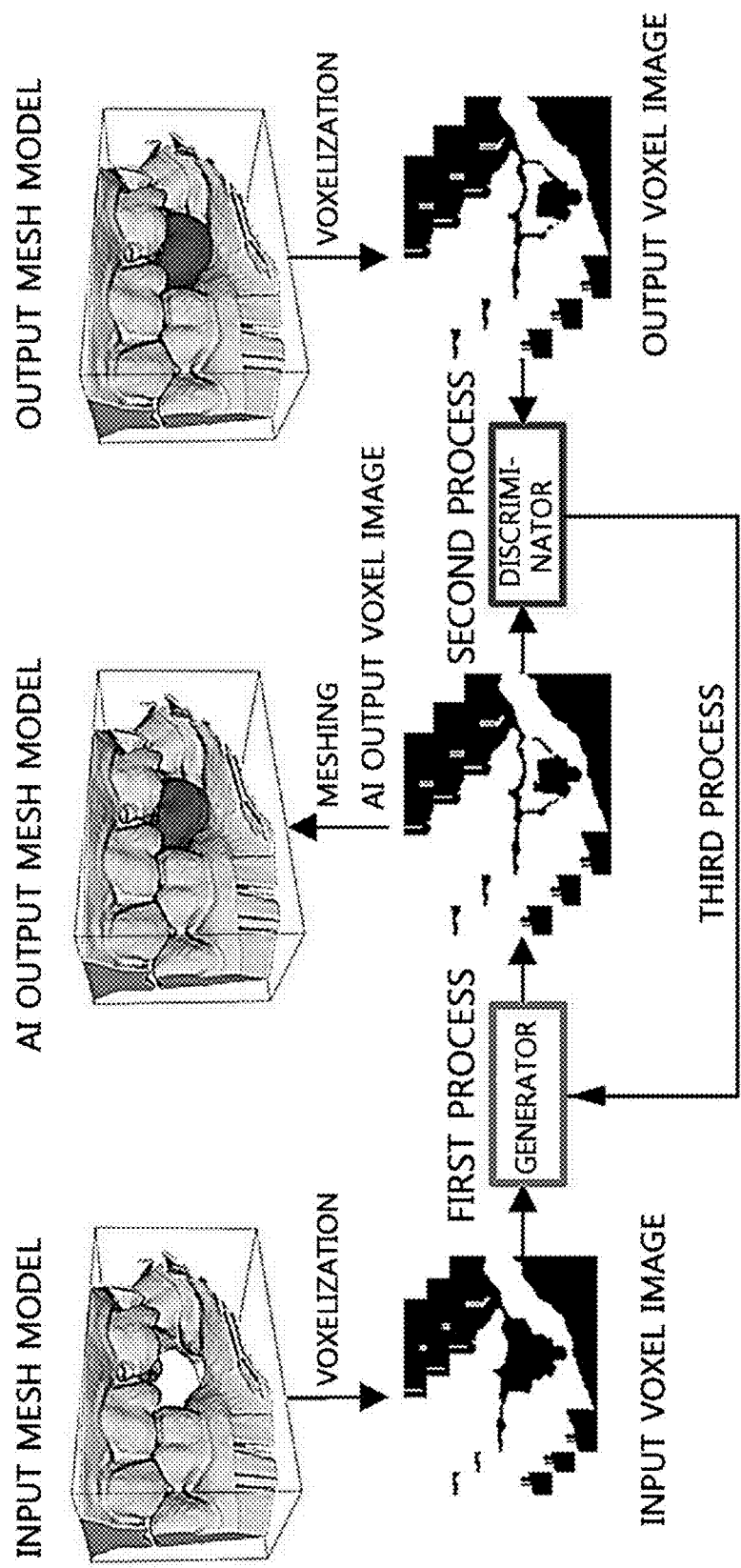
FIG. 4 illustrates a process of training an artificial neural network using training data, according to an embodiment.

FIG. 4 illustrates a process of training an artificial neural network using training data, according to an embodiment.

With reference to FIG. 4, a step of training the artificial neural network using training data is performed (S130). In an embodiment, the artificial neural network may be trained through a generative adversarial networks (GAN) model. A loss function of the artificial neural network may be defined as a parameterized function of shape information on teeth, information on adjacent teeth, and information on occlusal surface of teeth. The GAN is an unsupervised training algorithm that is trained by competing against imitation products. A generator of the GAN approximates probability distributions of the training data, and a discriminator determines an original source of the training data approximated by the generator. More specifically, the generator may be understood as a creator. The discriminator may be understood as a differentiator. The discriminator is trained using fake data created through the generator and real training data, and serves to distinguish whether a real sample is real or faked. The generator aims to create fake data that is indistinguishable from the real one, enough to deceive the discriminator. The discriminator according to the present embodiment continues to perform training in a direction of being good at discriminating and the generator continues to perform training in a direction of being good at deceiving the discriminator. Step S130 aims to eventually create data that makes it nearly impossible to distinguish whether the generator is real or fake, and also gradually improve an ability of distinguishing of the discriminator.

At step S130, using the converted input voxel image and output voxel image as training data, an AI output voxel image corresponding to the input voxel image is generated, and the artificial neural network is trained by comparing the generated AI output voxel image with the output voxel image included in the training data. According to a specific embodiment, a training process for an artificial neural network model may include a first process configured to generate an AI output voxel image corresponding to an input voxel image included in the training data using a generator, a second process configured to acquire error data by comparing the generated AI output voxel image with the output voxel image included in the training data using a discriminator, and a third process configured to train the generator using the error data. The artificial neural network may generate the AI output voxel image that corresponds to the input voxel image through trained nonlinear mapping.

In the first process, the AI output voxel image corresponding to the input voxel image included in the training data is generated using the generator. The generator may be configured with a plurality of layers including at least one convolutional layer and at least one transpose convolutional layer.

According to an embodiment, the convolutional layer constituting the generator receives the input voxel image and outputs a feature map that emphasizes the features of the area of interest. Specifically, the feature map that emphasizes the features of an image area is output by moving a filter at a certain interval (stride) and multiplying the filter by input data. As passing through the convolutional layer, the number of channels increases while the width, height, and depth of the image decreases. Values of the filter are constituted of weight parameters. The values of the filter are initially set at random and updated to be optimized through error backpropagation (updating the weight parameters by transmitting errors of results from an output layer in a direction of an input layer) in a training step.

The transpose convolutional layer is a layer that learns a process of synthesizing the feature map extracted by the convolutional layer into a target output image and restoring the size (upsampling). The feature map is output by multiplying the filter by the input data while moving the filter at certain intervals, and the input and output sizes are transposed unlike the convolutional layer. In other words, as the image passes through the transpose convolutional layer, the width, height, and depth of the image gradually increases and the number of channels decreases. A new image is generated based on the extracted features, by performing an inverse function of the convolutional layer.

According to an embodiment, the convolutional layer or transpose convolutional layer of the generator may be used in conjunction with an instance normalization to normalize the data distribution of the feature map and an activation function to determine the range of each output value. The instance normalization serves to stabilize the training process and alleviate the problem of overfitting in which the convolutional or transpose convolutional filter values (weights) are optimized only for the training data and not suitable for the test data in the training process. To stabilize the data distribution of the feature maps, the feature maps are normalized by the mean and standard deviation (by one factor passed to the model). After completing the training, the actual input test data is also normalized to the same mean and standard deviation stored during the training process, thereby more stably generating output images for data with a different distribution than the training data.

The activation function combines with the convolutional layer or transpose convolutional layer to determine the range of output values that will be passed from each layer to the other layers, and sets a threshold value for what values will be passed. In addition, nonlinearity is added to the deep learning model to alleviate the gradient vanishing effect, where the derivative of the error approaches zero and the weight parameters are not updated as the layers of the deep learning model get deeper. For example, as the activation function, a ReLu activation function that allows the input data to have a value of zero when the input data is less than or equal to zero, and a value as it is when the input data is greater than zero, a LeakyReLu activation function that serves a similar function as the ReLu activation function, but multiplies the input value by a value of 0.1 to prevent the input value from being completely zero when the input value is less than zero, and maintains the value when the input value is greater than zero, a Tan h activation function that allows the input data to have a value between −1 and 1, and a Sigmoid activation function that allows the input data to have a value between 0 and 1 may be used.

In the second process, error data is acquired by comparing the generated AI output voxel image with the output voxel image included in the training data using the discriminator. The discriminator may include a succession of convolutional layers, each of which, unlike the generator, is configured to receive the generated AI output voxel image as input and output a feature map that emphasizes the features of the area of interest. Like the generator, each convolutional layer can be used with an instance normalization to normalize the data distribution of the feature map and an activation function to determine the range of each output value.

According to an embodiment, the generator may include at least one residual block layer, which serves to reduce the training difficulty of the model, as deeper layers of the model become harder to optimize. The residual block layer is repeated between the convolutional layer (encoder), which makes the image smaller in width and height but wider in a channel direction, and the transpose convolutional layer (decoder), which restores the image to the same width, height, and channel as the original. One residual block is configured with the steps of convolution-instance normalization-ReLu activation-convolution-instance normalization, where the convolution outputs an image with the same width, height, depth, and channel size as the input image through the adjustment of filters and stride values. That is, the purpose is directed not to extract or restore the features of the input data, but to minimize the information loss of the data and pass the information to the next layer. For example, the residual block has the form of adding an input value of x to an output of the residual block, which leads to learning F(x), which is a difference between the input of x and the output of H(x), rather than the output of H(x) for the input data x. Accordingly, the previously trained input data x is taken as it is and added to the output so that only the residual information, F(x), may be trained, thereby simplifying the training process of the model.

In the third process, the error data is used to train the generator. That is, the AI output voxel image of a dental crown synthesized by the artificial neural network may be compared with the output voxel image generated based on an actual three-dimensional dental crown mesh image designed by a dental technician, and a result of the comparison may be input into the generator again to improve the performance of the generator to output a result that is more similar to the output voxel image in the next time. The artificial neural network according to an embodiment may be trained to reduce an error between the output voxel image and the generated AI output voxel image by repeating the first to third processes with various training data.

As described above, the generator may generate the AI output voxel image corresponding to the input voxel image through a nonlinear mapping, and the discriminator may generate a more sophisticated image (i.e., an image that is closer to the output voxel image) as the generator is repeatedly trained through a generative adversarial neural network (GAN) model that distinguishes the generated AI output voxel image from the output voxel image.

In an embodiment, the generator may be a convolutional layer-transpose convolutional layer (encoder-decoder) structure based on ResNet, and the discriminator may be a convolutional layer (encoder) structure based on PatchGAN.

Figure 5:
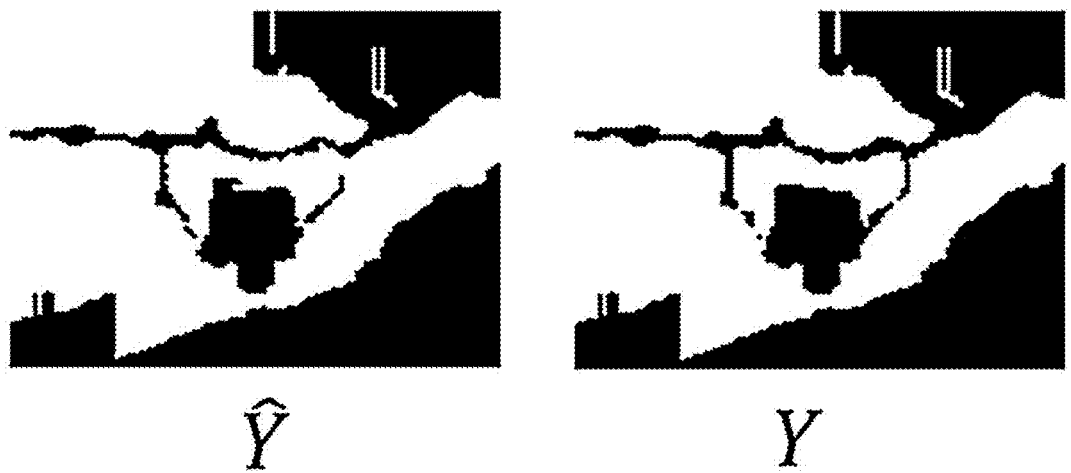
FIG. 5 illustrates a process of reducing a similarity error between an AI output voxel image generated in accordance with an embodiment and an actual output voxel image.

FIG. 5 illustrates a process of reducing a similarity error between an AI output voxel image generated in accordance with an embodiment and an actual output voxel image.

With reference to FIG. 5, in step S130 of training the artificial neural network, the artificial neural network may be trained to minimize the defined loss function of the discriminator. In an embodiment, first, the generator is fixed, and only the discriminator may proceed with training. Since the discriminator has already figured out which one is the dental crown image designed by the dental technician and which one is the synthesized dental crown image, the loss function is defined in a direction that distinguishes a fake sample from a real one. Next, the discriminator is fixed and the generator is trained. Since the purpose of the generator is directed to deceive the discriminator, the training is performed in a direction in which the discriminator can be mistaken. The third process repeatedly performs the above process, allowing the discriminator and generator to evolve and reach a state of equilibrium. The conventional neural network models are trained to minimize the loss function, but since the discriminator and generator are trained complementarily to each other, and consequently, the optimization may proceed in a direction in which the loss function reaches 0.5.

The third process may use not only an adversarial loss function in which the generator and discriminator described above compete, but also a dice similarity coefficient loss that reduces the error between the dental crown image designed by the dental technician and the synthesized dental crown image. The third process may reduce a similarity error between the output voxel image and the AI output voxel image using the dice similarity coefficient loss. the Dice similarity coefficient loss is calculated by the following [Equation 1], $$DSC = 1 - \frac{2*|Y \cap \hat{Y}|}{|Y|+|\hat{Y}|}$$ [Equation 1]

In [Equation 1] above, Y denotes an area where the pixel value of the output voxel image is 1, and $\hat{Y}$ denotes an area where the pixel value of the AI output voxel image generated by the generator is 1. If the area of the actual output voxel image and the predicted area of the AI output voxel image are exactly the same, the corresponding area is considered as 1; otherwise, it is considered as 0. By subtracting this similarity value from 1, the Dice similarity coefficient loss can be calculated.

Since the output of the artificial neural network is a two-dimensional depth image of a dental crown in the previous inventions, a separate process is required to restore the image to a mesh model. In addition, an additional process of designing a connector between the dental crown and gums was required for a portion where no information was available. The present application has the advantage that the corresponding process can be omitted because the crown is created while reducing the volume similarity based on 3D through the dice similarity coefficient loss.

Figure 6:
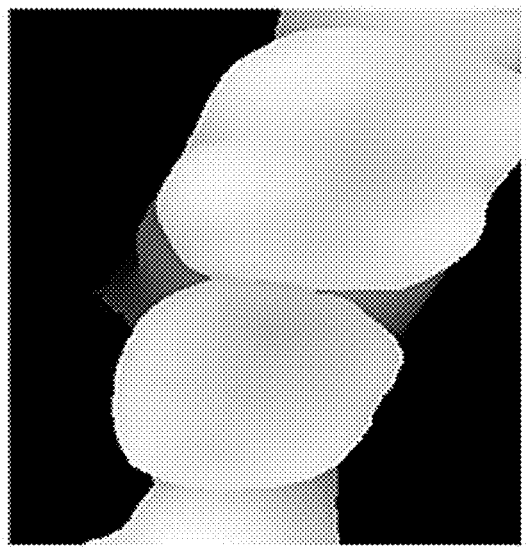
FIG. 6 illustrates a process of reducing a similarity error in consideration of occlusal surfaces between an AI output voxel image and an actual output voxel image, according to an embodiment.
Figure 6:
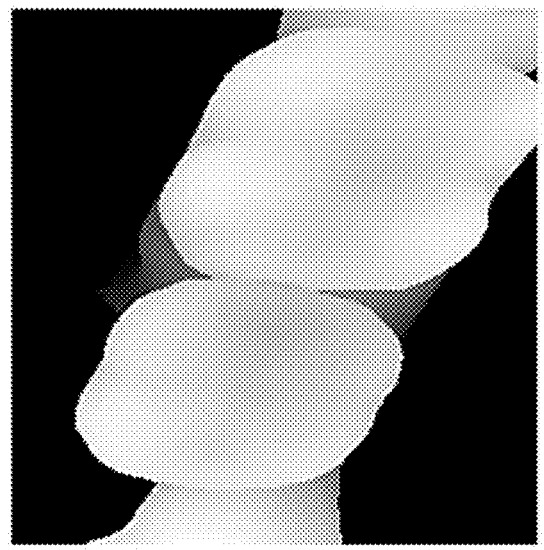

FIG. 6 illustrates a process of reducing a similarity error in consideration of occlusal surfaces between an AI output voxel image and an actual output voxel image, according to an embodiment.

With reference to FIG. 6, the third process may reduce a similarity error for a volumetric shape of a lateral surface of the dental crown considering an occlusal surface in the output voxel image and an occlusal surface in the AI output voxel image using a depth map loss. The Depth map loss can be obtained through the average pixel error between the depth map image of the real crown and the depth map image of the AI crown using Equation 2 below.

$$\text{Depth} = \frac{1}{n}\sum_{i=1}^{n}|Y_{depth(i)} - \hat{Y}_{depth(i)}|$$ [Equation 2]

In [Equation 2], $Y_{depth(i)}$ denotes the pixel value of the ith depth map image of the output voxel image, $\hat{Y}_{depth(i)}$ denotes the pixel value of the ith depth map image of the AI output voxel image, and n is the number of pixels of the depth map image.

The above method is designed to improve occlusal functionality of volume-based crowns obtained through Dice similarity coefficient loss. There is an advantage in obtaining a crown with improved occlusal functionality as well as the side of the crown if the volume similarity is improved during learning and the error of the occlusal surface is reduced at the same time. A method of obtaining a depth map image from the output voxel image and the AI output voxel image is described with reference to FIG. 7.

Figure 7:
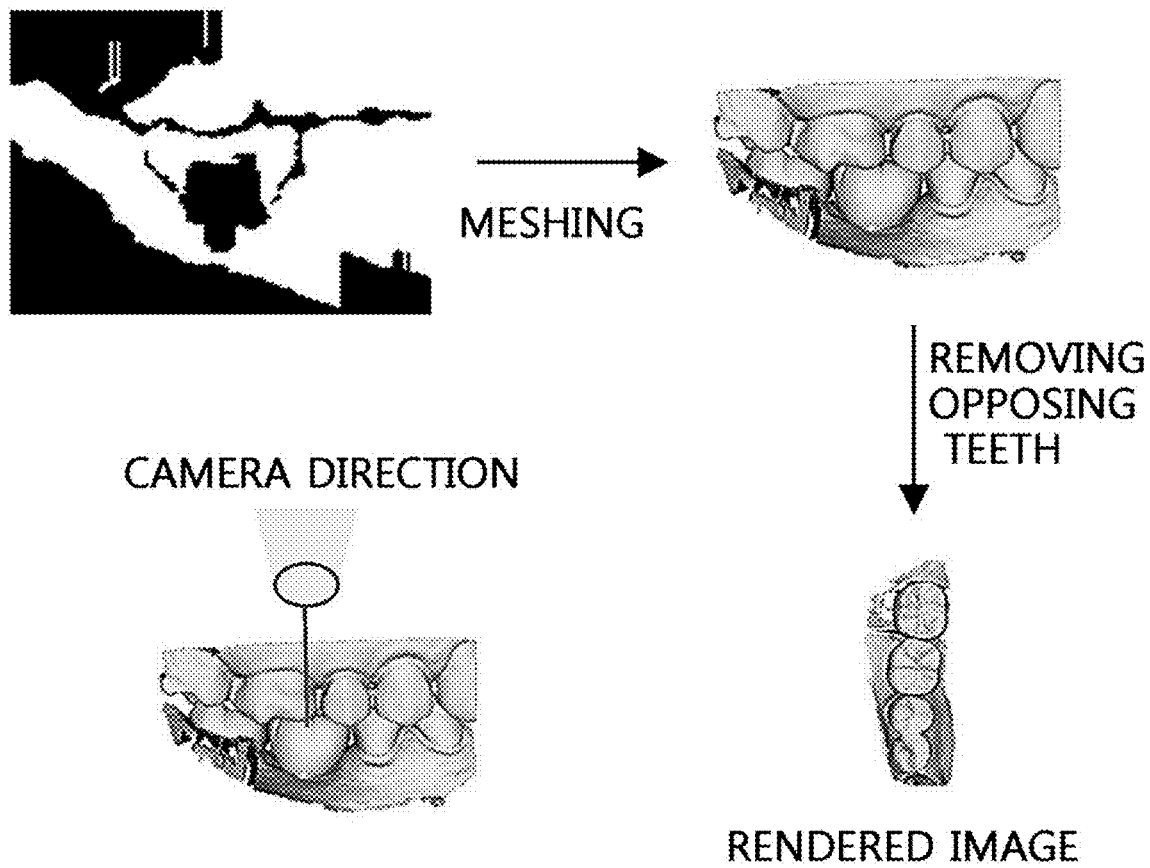
FIG. 7 illustrates a detailed process of reducing a similarity error in consideration of occlusal surfaces through rendering, according to an embodiment.

FIG. 7 illustrates a detailed process of reducing a similarity error in consideration of occlusal surfaces through rendering, according to an embodiment.

With reference to FIG. 7, the third process may represent the input voxel image as a depth map with all spatial information to create data that captures the shape of the teeth. The third process may include removing opposing teeth of a tooth for which a dental crown has been generated, after meshing the AI output voxel image generated by the generator, positioning a camera above the generated dental crown in a vertical direction, and setting a center of the dental crown as a focal position, and acquiring a depth map image through rendering.

Figure 8:
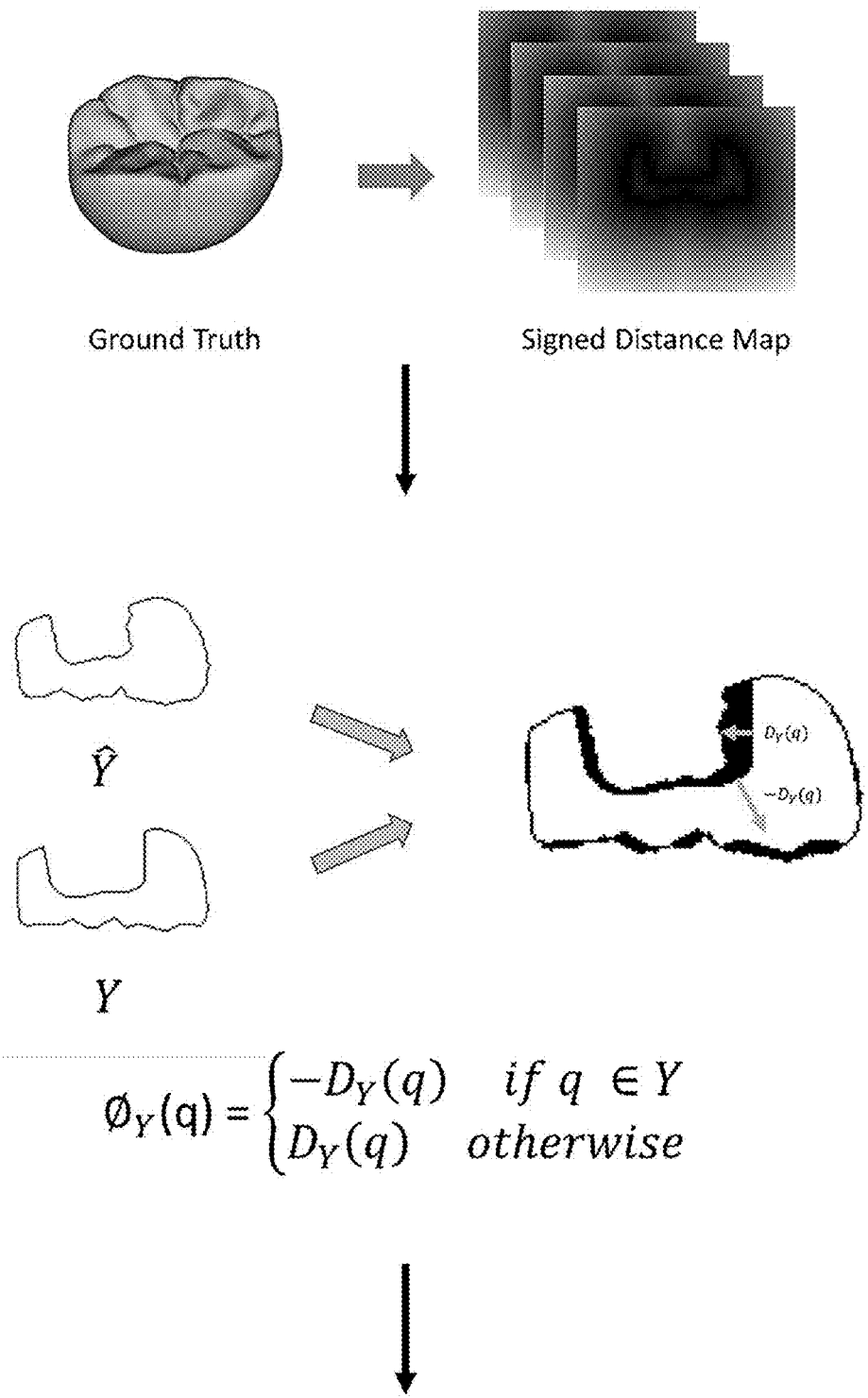
FIG. 8 illustrates a process of reducing a similarity error in consideration of a boundary distance between an AI output voxel image and an actual output voxel image, according to an embodiment.

FIG. 8 illustrates a process of reducing the similarity error by considering a boundary distance between the AI output voxel image and the actual output voxel image, according to an embodiment.

With reference to FIG. 8, the third process may reduce the similarity error for the volumetric shape of the dental crown considering a distance between a boundary surface in the output voxel image and a boundary surface in the AI output voxel image using a boundary loss. The third process above may include creating a signed distance map in which a distance is calculated from a boundary surface of an actual output voxel image, acquiring an integral value of a distance Oy between a boundary line Y of an AI output voxel image and a boundary line Y of an actual output voxel image for a point q on the boundary line Y of the actual output voxel image using the calculated signed distance map, and training the AI output voxel image in a direction $(\min(\text{Dist}(\partial Y, \partial \hat{Y})))$ that reduces the distance between the AI output voxel image and the actual output voxel image.

In the creating of the signed distance map in which the distance is calculated from the boundary surface of the output voxel image, a signed distance map matrix is calculated that represents a distance from a surface of a ground truth (dental technician design) output voxel image. The signed distance map matrix is used to find a distance integral value between the output voxel image (the dental technician design) and the AI output voxel image.

In the acquiring of the integral value of the distance $\emptyset_Y$ between the boundary line $\hat{Y}$ of the AI output voxel image and the boundary line Y of the actual output voxel image for the point q on the boundary line Y of the actual output voxel image using the calculated signed distance map, the distance $D_Y$ between the boundary line Y of the voxel image designed by the dental technician and the boundary line $\hat{Y}$ of the AI output voxel image is calculated for the point q on Y. When $\hat{Y}$ is positioned outside the Y area, it is calculated as $+D_Y$, and when $\hat{Y}$ is positioned inside the Y area, it is calculated as $-D_Y$. The distance $\emptyset_Y(q)$ from q to Y may be acquired.

$\int_\Omega \emptyset_Y(q)dq$ may be calculated by matrix multiplying the calculated signed distance map with the AI output voxel image. Finally, the training of the AI model proceeds in the direction of reducing this distance integral value ($\int_\Omega \emptyset_Y(q)dq$, the integral value of the distance error between the boundary lines), so that the training proceeds to reduce the similarity error between the output voxel image (the dental technician design) and the AI output voxel image.

Figure 9:
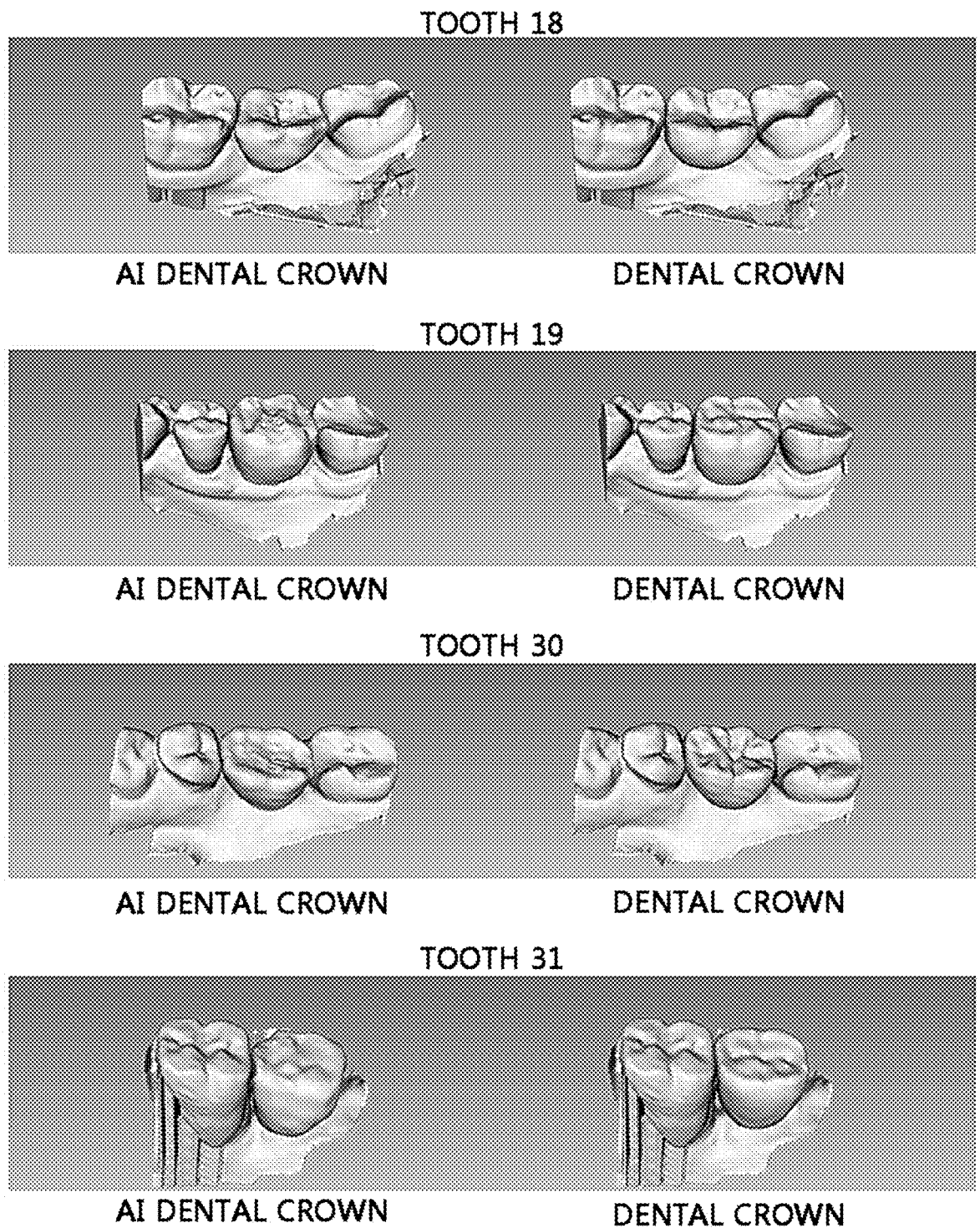
FIG. 9 illustrates a comparison of an AI output mesh model generated according to an embodiment with an actual three-dimensional dental crown designed by a dental technician.

FIG. 9 illustrates a comparison of an AI output mesh model generated according to an embodiment with an actual three-dimension dental crown designed by a dental technician.

With reference to FIG. 9, the dental crown design method is exemplarily applied to the data of teeth 18, 19, 30, and 31, which are mandibular molars, but the same method may be applied to other teeth numbers. The drawings on the left side illustrate the AI output mesh model generated using the neural network described above, while the drawings on the right side illustrate an actual three-dimensional dental crown model designed by a dental technician. As illustrated, it can be seen that the generated AI output mesh model and the actual three-dimensional dental crown designed by a dental technician are visually similar, and that the morphological characteristics of the dental crown are not only complemented by building a dimension-based model, but also the shape of the occlusal surface is taken into account. This means that a synthesized AI output mesh model is sufficient to be applied to a dental crown design, rather than an actual three-dimensional dental crown designed by a dental technician.

The dental crown design method based on artificial intelligence, according to an embodiment, may be implemented as an application or in the form of program instructions that may be executed through various computer components and recorded on a computer-readable recording medium. The computer-readable recording medium may include program instructions, data files, data structures, or the like, in a stand-alone form or in a combination thereof.

Examples of the computer-readable recording medium may include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions.

Examples of the program instructions may include machine-language codes made by, for example, a compiler, as well as high-language codes that may be executed by, for example, a computer, by using an interpreter. The above hardware devices may be configured to operate as one or more software modules in order to perform the operation of the present application, and the opposite is also possible.

According to the embodiments described above, the artificial neural network can be used to generate an AI output voxel image corresponding to an input voxel image. The performance of the artificial neural network can be improved through competitive training of the generator and discriminator, and it is possible to generate an accurate AI output voxel image with a low error rate.

According to another aspect of the present application, a system for automating a dental crown design based on artificial intelligence may be performed by a computing device including a processor.

In an embodiment, a system for automating a dental crown design based on artificial intelligence may include: a unit for acquiring a three-dimensional intra-oral scanner image acquired from a patient and a three-dimensional dental crown mesh image designed by a dental technician in correspondence with the intra-oral scanner image—wherein the intra-oral scanner image includes scanned images of adjacent and opposing teeth for which a dental crown is to be generated—; a unit for preprocessing the acquired three-dimensional intra-oral scanner image and the three-dimensional dental crown mesh image designed by the dental technician in correspondence with the intra-oral scanner image—wherein an input mesh model combining adjacent and opposing teeth and an output mesh model combining the input mesh model with the dental crown designed by the dental technician are each generated based on the three-dimensional intra-oral scanner image—; a unit for converting the input mesh model and the output mesh model into an input voxel image and an output voxel image, respectively; and a unit for generating an AI output voxel image corresponding to the input voxel image using the converted input voxel image and output voxel image as training data, and training an artificial neural network by comparing the generated AI output voxel image with the output voxel image included in the training data.

According to the method and system for automating a dental crown design based on artificial intelligence according to an embodiment of the present application, it is not necessary to generate a dental crown surface and connector model restored in three dimensions when using a two-dimensional based model by using a three-dimensional based model. It is possible to increase work efficiency and reduce labor costs for related professions by automating the design of patient-customized dental crowns. It is possible to improve product precision and quality uniformity by preventing design deviations due to dental technicians' skill level or fatigue. It is possible to link the developed artificial neural network with digital medical devices and software to consistently use accurate data from diagnosis to treatment and the production of dental prosthesis, and it is possible to produce the dental prosthesis immediately upon the patient's visit and perform the treatment on the same day.

While the present application has been described above with reference to the exemplary embodiments, it may be understood by those skilled in the art that the present application may be variously modified and changed without departing from the spirit and scope of the present disclosure disclosed in the claims.

What is claimed is:

1. A method of automating a dental crown design based on artificial intelligence executed by a processor, the method comprising:
    acquiring a three-dimensional intra-oral scanner image acquired from a patient and a three-dimensional dental crown mesh image designed by a dental technician in correspondence with the intra-oral scanner image—wherein the intra-oral scanner image includes scanned images of adjacent and opposing teeth for which a dental crown is to be generated—;
    preprocessing the acquired three-dimensional intra-oral scanner image and the three-dimensional dental crown mesh image designed by the dental technician in correspondence with the intra-oral scanner image—wherein an input mesh model combining adjacent and opposing teeth and an output mesh model combining the input mesh model with the dental crown designed by the dental technician are each generated based on the three-dimensional intra-oral scanner image—;
    converting the input mesh model and the output mesh model into an input voxel image and an output voxel image, respectively; and
    generating an AI output voxel image corresponding to the input voxel image using the converted input voxel image and output voxel image as training data, and training an artificial neural network by comparing the generated AI output voxel image with the output voxel image included in the training data.

2. The method of claim 1, further comprising:
    receiving a three-dimensional intra-oral scanner image including scanned images of adjacent teeth and opposing teeth for which a dental crown is to be generated;
    preprocessing the three-dimensional intra-oral scanner image—wherein an input mesh model combining adjacent teeth and opposing teeth based on the intra-oral scanner image;
    converting the input mesh model into an input voxel image;

generating an AI output voxel image corresponding to the input voxel image by inputting the input mesh model to a trained artificial neural network; and generating an AI output mesh model by meshing the AI output voxel image.

3. The method of claim 2, further comprising:

extracting an STL file, based on the AI output mesh model, so that the dental crown is actually produced from a milling machine.

4. The method of claim 1, wherein the training of the artificial neural network comprises:

a first process configured to generate an AI output voxel image corresponding to an input voxel image included in the training data using a generator;

a second process configured to acquire error data by comparing the generated AI output voxel image with an output voxel image included in the training data using a discriminator; and a third process configured to train the generator using the error data.

5. The method of claim 4, wherein the artificial neural network is trained to reduce an error between the output voxel image and the generated AI output voxel image by repeatedly performing the first to third processes.

6. The method of claim 1, wherein the preprocessing comprises:

setting a bounding box based on an area of interest in the intra-oral scanner image; and removing unnecessary portions for training, and wherein the area of interest is set to include at least one or more adjacent teeth and opposing teeth with respect to the dental crown to be generated.

7. The method of claim 4, wherein the third process reduces a similarity error between the output voxel image and the AI output voxel image using a dice similarity coefficient loss.

8. The method of claim 7, wherein the Dice similarity coefficient loss is calculated by the following [Equation 1], $$DSC = 1 - \frac{2*|Y \cap \hat{Y}|}{|Y| + |\hat{Y}|}$$ [Equation 1]

Y denotes an area where the pixel value of the output voxel image is 1, and $\hat{Y}$ denotes an area where the pixel value of the AI output voxel image generated by the generator is 1.

9. The method of claim 4, wherein the third process reduces a similarity error for a volumetric shape of a lateral surface of the dental crown considering an occlusal surface in the output voxel image and an occlusal surface in the AI output voxel image using a depth map loss.

10. The method of claim 9, wherein the depth map loss is calculated by the following [Equation 2], $$\text{Depth} = \frac{1}{n}\sum_{i=1}^{n}|Y_{depth(i)} - \hat{Y}_{depth(i)}|$$ [Equation 2]

$Y_{depth(i)}$ denotes the pixel value of the ith depth map image of the output voxel image, $\hat{Y}_{depth(i)}$ denotes the pixel value of the ith depth map image of the AI output voxel image, and n is the number of pixels of the depth map image.

11. The method of claim 4, wherein the third process uses a boundary loss to reduce a similarity error for a volumetric shape of a lateral surface of the dental crown considering a distance between a boundary surface in the output voxel image and a boundary surface in the AI output voxel image.

12. The method of claim 9, wherein the third process comprises:

removing opposing teeth of a tooth for which the dental crown has been generated, after meshing the AI output voxel image generated by the generator;

positioning a camera above the generated dental crown in a vertical direction, and setting a center of the dental crown as a focal position; and acquiring a depth map image through rendering.

13. The method of claim 11, wherein the third process comprises:

creating a signed distance map in which a distance is calculated from a boundary surface of the output voxel image;

acquiring an integral value of a distance between a boundary line of the AI output voxel image and a boundary line of the output voxel image for a point on the boundary line of the output voxel image using the calculated signed distance map; and performing a training in a direction that reduces a distance between the AI output voxel image and the output voxel image.

14. The method of claim 4, wherein the generator is a convolutional layer-transpose convolutional layer (encoder-decoder) structure based on ResNet.

15. The method of claim 4, wherein the discriminator is a convolutional layer (encoder) structure based on Patch-GAN.

16. The method of claim 1, wherein the artificial neural network generates an AI output voxel image corresponding to an input voxel image through trained nonlinear mapping.

17. A computer program stored on a non-transitory computer-readable recording medium for executing the method of automating a dental crown design based on artificial intelligence according to claim 1.

18. A system for automating a dental crown design based on artificial intelligence, the system comprising:

a unit for acquiring a three-dimensional intra-oral scanner image acquired from a patient and a three-dimensional dental crown mesh image designed by a dental technician in correspondence with the intra-oral scanner image—wherein the intra-oral scanner image includes scanned images of adjacent and opposing teeth for which a dental crown is to be generated—;

a unit for preprocessing the acquired three-dimensional intra-oral scanner image and the three-dimensional dental crown mesh image designed by the dental technician in correspondence with the intra-oral scanner image—wherein an input mesh model combining adjacent and opposing teeth and an output mesh model combining the input mesh model with the dental crown designed by the dental technician are each generated based on the three-dimensional intra-oral scanner image—;

a unit for converting the input mesh model and the output mesh model into an input voxel image and an output voxel image, respectively; and a unit for generating an AI output voxel image corresponding to the input voxel image using the converted input voxel image and output voxel image as training data, and training an artificial neural network by comparing the generated AI output voxel image with the output voxel image included in the training data.

* * * * *